(12) United States Patent
Lulofs

(10) Patent No.: US 6,916,387 B2
(45) Date of Patent: Jul. 12, 2005

(54) WELD REPAIR OF SUPERALLOY CASTINGS

(75) Inventor: James B. Lulofs, LaPorte, IN (US)

(73) Assignee: Howmet Corporation, Cleveland, OH (US)

( * ) Notice: Subject to any disclaimer, the term of this patent is extended or adjusted under 35 U.S.C. 154(b) by 184 days.

(21) Appl. No.: 10/140,004

(22) Filed: May 6, 2002

(65) Prior Publication Data

US 2003/0205303 A1 Nov. 6, 2003

(51) Int. Cl.⁷ .............................................. C21D 10/00
(52) U.S. Cl. ..................... 148/558; 148/512; 148/516; 148/522; 148/524
(58) Field of Search ................................ 148/588, 512, 148/516, 522, 524

(56) References Cited

U.S. PATENT DOCUMENTS

| | | | |
|---|---|---|---|
| 1,939,712 A | 12/1933 | Mahoux | 148/10 |
| 2,848,775 A | 8/1958 | Ettenreich | 22/200 |
| 2,908,801 A | 10/1959 | Cresswell | 219/74 |
| 3,274,033 A | 9/1966 | Jacke | 148/12.9 |
| 3,622,404 A | 11/1971 | Thompson | 148/12.9 |
| 3,677,831 A | 7/1972 | Pezaris et al. | 148/12.9 |
| 3,741,820 A | 6/1973 | Hebel, Jr. et al. | 148/12.9 |
| 3,864,542 A | 2/1975 | Fletcher et al. | 219/137 |
| 4,381,673 A | 5/1983 | Klauba et al. | 73/579 |
| 4,386,727 A | 6/1983 | Unde | 228/102 |
| 4,409,462 A | 10/1983 | Jahnke | 219/121 ED |
| 4,711,986 A | 12/1987 | Lillquist et al. | 219/130.01 |
| 4,823,599 A | 4/1989 | Schneider | 73/579 |
| 4,878,953 A | 11/1989 | Saltzman et al. | 148/4 |
| 4,968,359 A | 11/1990 | Hebel, Jr. et al. | 148/12.9 |
| 5,086,207 A | 2/1992 | Deam | 219/130.01 |
| 5,831,241 A | 11/1998 | Amos | 219/137 PS |
| 6,120,624 A | 9/2000 | Vogt et al. | 148/675 |
| 6,223,974 B1 | 5/2001 | Unde | 228/199 |

FOREIGN PATENT DOCUMENTS

| | | |
|---|---|---|
| DE | 39 42 079 A1 | 6/1991 |
| EP | 0 491 189 A1 | 6/1992 |
| JP | 53022841 * | 3/1978 |
| JP | 61193776 | 8/1986 |

* cited by examiner

*Primary Examiner*—Sikyin Ip
(74) *Attorney, Agent, or Firm*—Edward J. Timmer; Gary P. Topolosky; Eckert Seamans Cherin & Mellot, LLC

(57) ABSTRACT

A method of repairing a void on a nickel or cobalt base superalloy investment casting by vibrating the casting for a time before repairing the void, vibrating the casting while filling the void wherein the void is filled by repeatedly making incremental weld deposits of a superalloy filler material in the void using pulsed gas tungsten arc welding, and impinging each incremental deposit with a cooling gas after each incremental weld deposit is made and before the next incremental weld deposit is made, and vibrating the casting for a time after the void is filled.

6 Claims, 3 Drawing Sheets

WELD REPAIR OF SUPERALLOY CASTINGS

FIELD OF THE INVENTION

The present invention relates to welding of nickel and cobalt base superalloys and, more particularly, to the weld repair and welding of nickel and cobalt base superalloy investment castings.

BACKGROUND OF THE INVENTION

Precipitation hardenable nickel and cobalt base superalloys of the gamma-gamma prime type are extensively used in the form of investment castings for gas turbine engine components. Such investment castings can exhibit as-cast surface defects in the form of surface voids. For purposes of illustration, such surface voids can include an as-cast void present on the casting surface when the casting is removed from the shell mold, a void remaining on the casting surface after an inclusion has been removed therefrom, and a crack or crack-like void on the casting surface present when the casting is removed from the investment shell mold. In the past, the presence of such surface voids has been cause for rejection and scrapping of investment castings made of certain unweldable or marginally weldable superalloys, such as for example, MAR-M 247 nickel base superalloy, which cannot be fusion welded without cracking of the base metal heat-affected zone and/or filler material cracking.

SUMMARY OF THE INVENTION

The present invention provides in one embodiment a method of weld repairing of a nickel or cobalt superalloy casting in a manner that allows so-called unweldable or marginally weldable superalloy castings to be repaired or welded without weld-induced cracking of the casting, such as, for example, without cracking of the base metal heat-affected zone.

An illustrative embodiment of the invention involves vibrating the investment casting for a time before filling the void with filler material, vibrating the investment casting while filling the void by repeatedly making incremental weld deposits of a superalloy filler material in the void using for example pulsed gas tungsten arc welding, including impinging each incremental deposit with a cooling gas after each incremental weld deposit is made and before the next incremental weld deposit is made, and vibrating the investment casting for a time after the void is filled.

The invention is advantageous to weld repair one or more surface voids of nickel or cobalt superalloy investment castings without weld-induced cracking of the casting.

The present invention is also advantageous to provide a welding method for welding a nickel or cobalt superalloy member in a manner that allows so-called unweldable or marginally weldable superalloys to be welded without weld-induced cracking.

The above advantages of the present invention will become more readily apparent from the following detailed description taken with the following drawings.

DESCRIPTION OF THE INVENTION

The present invention provides in one embodiment a method of weld repairing a nickel or cobalt superalloy investment casting in a manner that allows so-called unweldable or marginally weldable superalloy investment castings to be repaired without weld-induced cracking of the casting, such as, for example, without cracking of the base metal heat-affected zone. The invention can be practiced to repair one or more voids on exterior surfaces of investment castings of myriad configurations. The void(s) to be repaired can originate from various causes and have various void configurations.

The invention can be used to weld nickel base superalloys including, but not limited to, MAR-M-247, MAR-M-246, IN-100, IN-713C, IN-713LC, IN-718, IN-738, IN-792HF, IN-792M5A, IN-909, IN-939, UDIMET 500, and AIRESIST 319 which are commercially available. Of these nickel base superalloys, the following have been considered in the past to be unweldable as a result of inevitable cracking of the base metal heat-affected zone: MAR-M-247, MAR-M-246, IN-100, IN-713C, IN-713LC, IN-738, IN-792HF, and IN-792M5A. The following have been considered in the past to be only marginally weldable as a result of frequent cracking of the base metal heat-affected zone: IN-909, IN-939, UDIMET 500, AND AIRESIST 319. The invention also can be used to weld cobalt base superalloys including, but not limited to, X-40, X-45, FSX-414, STELLITE 25, STELLITE 31, which are commercially available. Cobalt base superalloys X-40 and STELLITE 31 have been considered in the past to be only marginally weldable as a result of frequent cracking of the base metal heat-affected zone.

Figure 1:
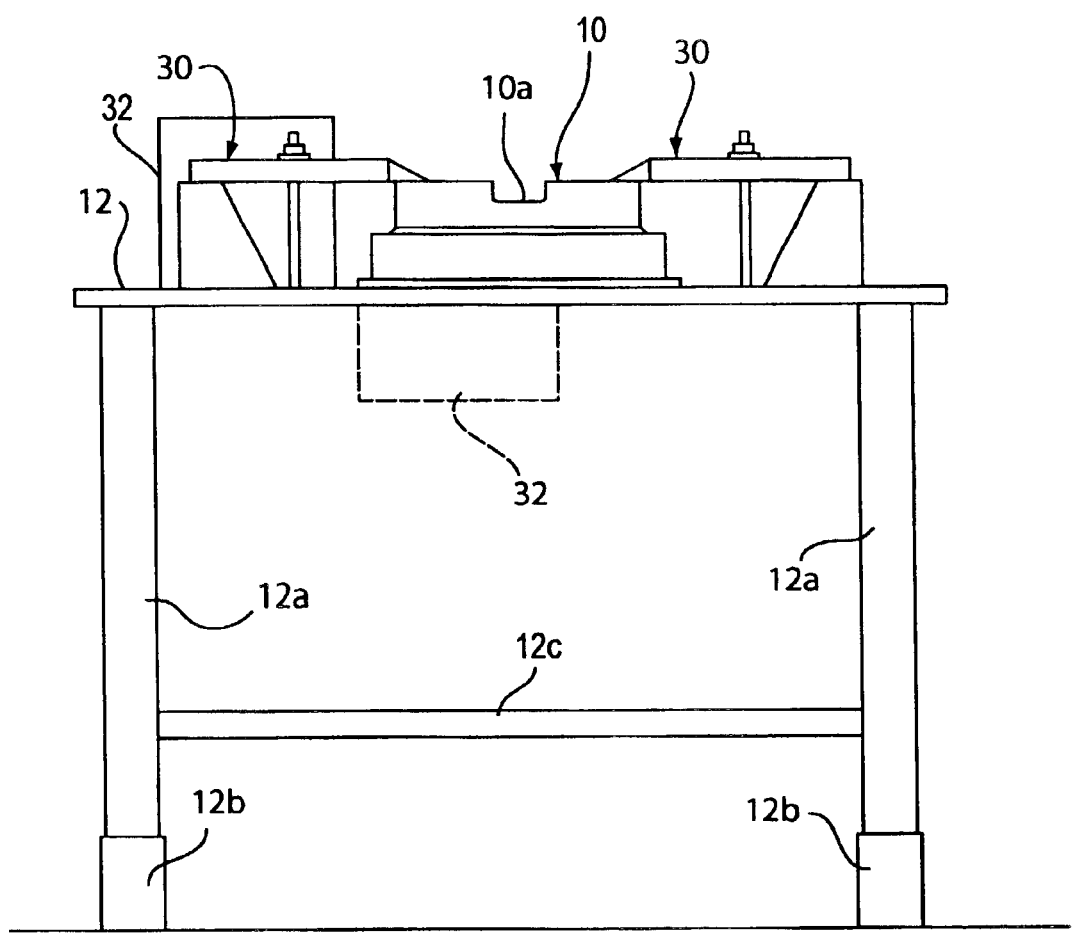
FIG. 1 is a schematic illustration of a welding table on which a superalloy investment casting is fixtured for weld repair.
Figure 2:
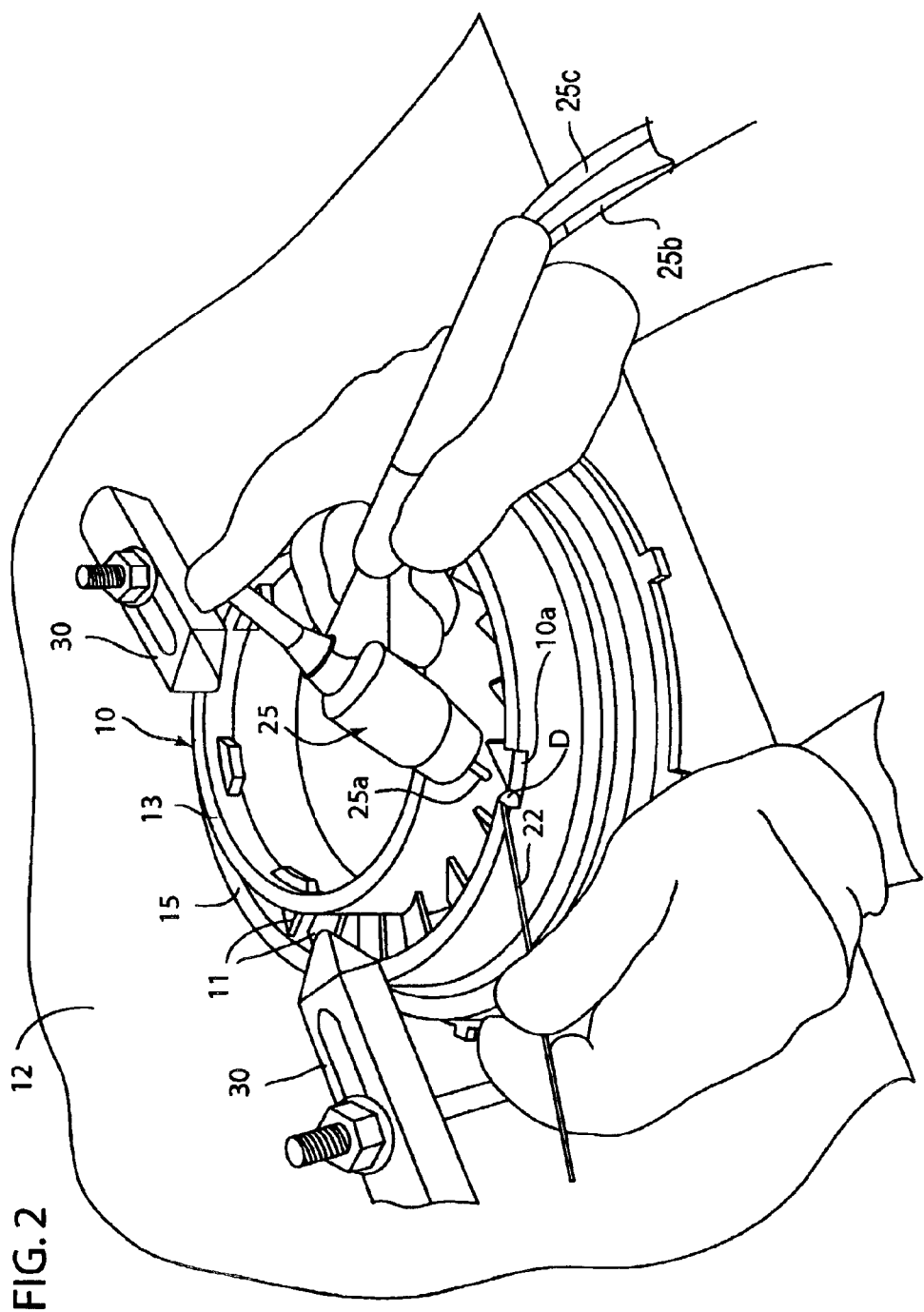
FIG. 2 is a perspective view of a superalloy investment casting having a void to be repaired by TIG weld repair.
Figure 3:
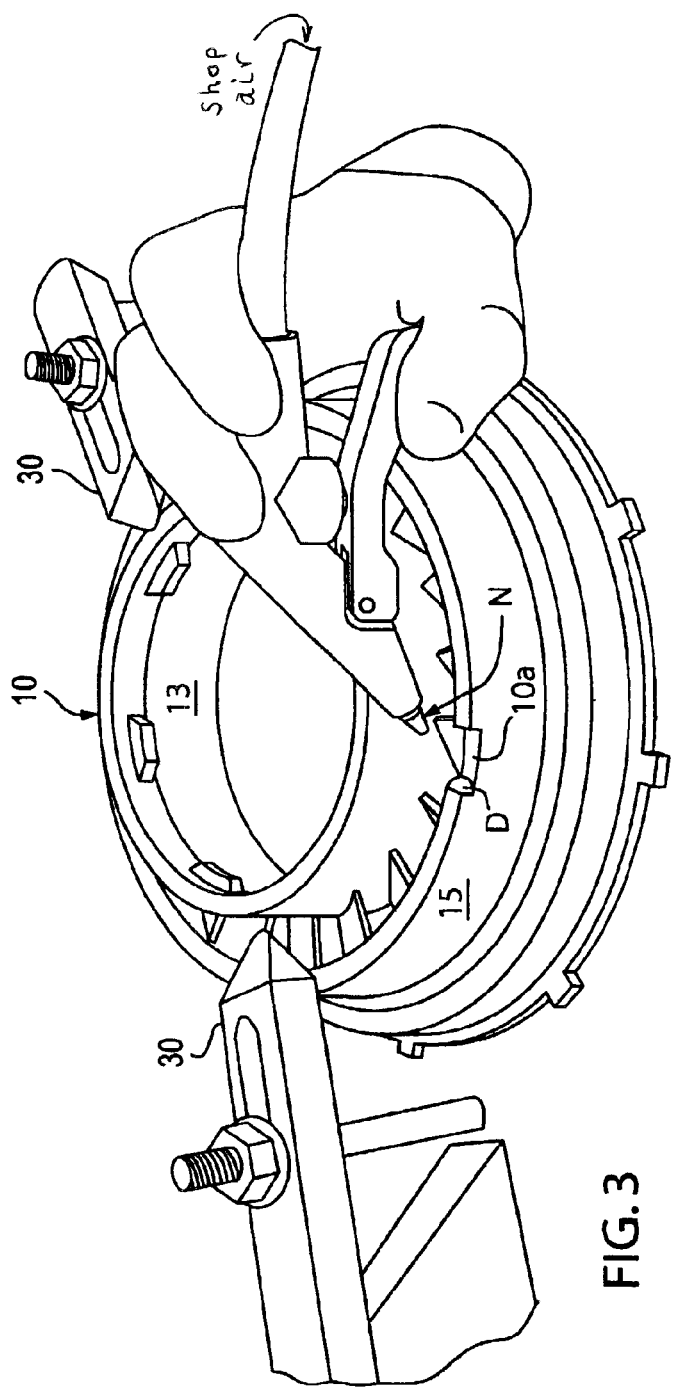
FIG. 3 is a perspective view of the superalloy investment casting showing compressed shop air being directed at an incremental weld deposit.

Referring to FIGS. 1–3, in practicing an illustrative embodiment of the invention, a nickel or cobalt base superalloy investment casting 10 having one or more surface voids 10a (one shown in FIGS. 2–3) on an exterior surface is fixtured on a welding table 12. The surface void(s) 10a can include an as-cast void present on the casting surface when the casting is removed from the shell mold, a void remaining on the casting surface after an inclusion has been removed therefrom, and/or a crack or crack-like void on the casting surface present when the casting is removed from the investment shell mold. Before the investment casting 10 is welded, it typically is conventionally solution heat treated to solution at least a portion of the gamma prime phase present in the gamma matrix and then cooled to room temperature before it is weld repaired. For purposes of illustration and not limitation, a typical solution heat treatment for MAR-M-247 involves heating to 2165 degrees F. for 2 hours and then cooling to room temperature at cooling rate of 50–100 degrees F. per minute. Solution heat treatments for nickel and cobalt base superalloys are well known in the art.

For purposes of illustration only, in FIG. 2, an investment casting 10 comprising a turbine nozzle having a plurality of vanes 11 between inner and outer annular shrouds 13, 15 is shown having a circumferentially elongated void 10a on the edge of the outer shroud 15. This void 10a resulted from a casting process defect. As mentioned above, the void(s) to be repaired can originate from various causes and have various void configurations.

The void 10a is filled with a compatible superalloy filler material 20 by the weld repair of the invention as described in more detail below. The filler material 20 is supplied from a filler wire 22 that is melted and deposited in the void 10a using pulsed gas tungsten arc welding until the void is filled to conform to the adjacent outer shroud surfaces. The filler material 20 can have the same or different alloy composition as that of the investment casting 10. For purposes of illustration and not limitation, in repair welding IN-718 nickel base superalloy, the filler material can comprise the same alloy composition. In repair welding MAR-M-247 nickel base superalloy, the filler material can comprise the same alloy composition or a different alloy composition, such as, for example, a C263 (also known as NIMONIC 263) nickel base superalloy filler or IN-625 nickel base superalloy filler. For purposes of illustration and not limitation, when welding an IN939 nickel base superalloy investment casting, the filler material 20 comprises NIMONIC 263 filler (nominal composition 20% Cr, 20% Co, 2.15% Ti, 5.9% Mo, 0.45% Al, 0.06% C on weight % basis).

In FIG. 2, the investment casting 10 is illustrated as being clamped on a steel welding table 12 by a pair of screw clamps 30. The investment casting 10 can be fixtured on table 12 by any suitable means for holding the investment casting in fixed position on the welding table. The table 12 is schematically shown in FIG. 1 to include a transducer 32 disposed on the top surface of the table top (or alternatively on the bottom surface of the table top as shown in dashed lines, or other surface of the table) to vibrate the table and thus the investment casting 10 fixtured thereon at a selected sub-harmonic frequency determined from the mass of the table and the investment casting. The transducer 32 can be clamped or otherwise attached on the table top, bottom or other surface. The four legs 12a (two shown) of table 12 rest on rubber pads 12b. A storage tray 12c is welded in place between the table legs 12a below the table top. For the welding table described above and the investment casting 10 shown, the selected sub-harmonic frequency is 45 Hertz for purposes of illustration, although it can be in the range of 40 to 50 Hertz.

In practicing a method embodiment of the invention, the table 12 is vibrated for a selected time before weld repairing the void 10a on investment casting 10 to relieve internal stresses present in the solution heat treated investment casting. The time of vibration is determined empirically and was selected to be 60 minutes for the welding table 12 described above and the investment casting 10 shown, although other pre-weld vibration time periods can be used in practice of the invention.

This vibration of the table 12 and investment casting 10 thereon is continued during the weld repair of the void 10a where the void 10a is filled by repeatedly making incremental weld deposits D of superalloy filler material 20 in the void using pulsed gas tungsten arc welding, or other arc welding method, and where each incremental deposit is impinged with a cooling gas after each weld deposit is made and before the next incremental weld deposit is made. A conventional pulsed gas tungsten arc welding machine can be used to make the weld repair. A useful welding machine is available as model AEROWAVE 300 welding machine from Miller Electric Mfg. Co., P.O. Box 1079, Appleton, Wis., 54912. Such a welding machine includes welding torch 25 having a tungsten electrode 25a electrical power cable 25b, and a conduit 25c for supplying shielding gas, such as argon, about the electrode tip as is well known.

The pulsed tungsten arc welding is conducted using a pulsed welding current. For purposes of illustration and not limitation, the welding current set to pulse to 80 amperes at 450 pulses/second with a 65% "on" time, the welding current being pulsed from a background current of 6 amperes. The welding current can be pulsed in the range of 440 to 460 pulses per second to a pulse current in the range of 75 to 85 amperes with a background current of 5 to 8 amperes for the investment casting 10 shown, although other welding parameters can be used and determined empirically to achieve filling of the void 10a.

Figure 4:
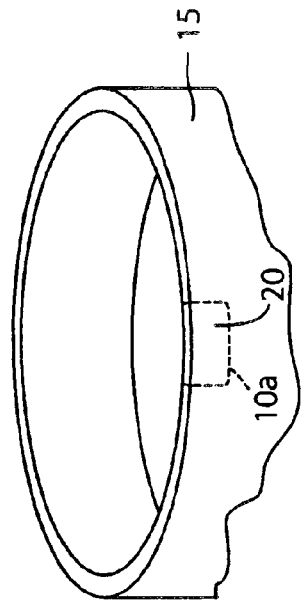
FIG. 4 is an enlarged view of a void on an investment casting filled with superalloy filler material.

As mentioned, the void 10a is filled by making incremental weld deposits D, FIGS. 2–3, of superalloy filler material 20 in the void until the void is filled with filler material 20, FIG. 4. The filler material 20 blends into the surrounding base metal (superalloy) such that there is no demarcation line between the filler material and the base metal. The weld deposits can be laid down in side-by-side manner in the void 10a and/or stacked one atop the other in the void, or made in any manner to fill the void 10a. For purposes of illustration only, a typical weld deposit D has a hemispherical shape with a diameter of approximately ⅛ inch, although any other size or shape of weld deposit can be used in filling the void 10a. The weld repair typically is made manually by a welding operator holding the filler wire 22 in one hand and the welding torch 25 in the other hand as shown in FIG. 2.

After each small incremental weld deposit D of filler material 20 is made, each weld deposit is immediately cooled by impinging the deposit with a flow of a cooling gas before the next weld deposit is made. The cooling gas can comprise compressed shop air at 20 to 90 psi directed from a air nozzle N at each weld deposit D as illustrated in FIG. 3 for 60 seconds or other suitable time period to rapidly cool the deposit to room temperature. Other cooling gases may be used including, but not limited to, nitrogen, inert gas such as helium or argon, and others.

The above described repeated deposition of the weld deposits D in the void 10a of the vibrated investment casting 10 followed immediately by forced gas cooling of each weld deposit before the next weld deposit is made is continued until the void 10a is filled with the filler material 20. Vibration of table 12 and thus investment casting 10 is carried out throughout the entire period of time to conduct the weld repair of the void 10a to stress relieve the casting and the weld.

The table 12 continues to be vibrated for a selected time after weld repair of the void 10a on investment casting 10 to relieve any internal stresses present in the filled void 10a. The time of vibration is determined empirically and is selected to be 60 minutes for the welding table 12 described above and the investment casting 10 shown, although other post-weld vibration time periods can be used in practice of the invention.

Then, the repaired investment casting 10 can be subjected to a machining operation to bring the filler material 20 in the void 10a to blueprint dimensions followed by a conventional solution heat treatment and age hardening heat treatment to develop appropriate mechanical properties for the particular nickel or cobalt base superalloy involved.

The method of the present invention enables the void 10a to be filled with the filler material 20 for repair purposes without cracking of the base metal heat-affected zone. Investment castings made of various different nickel and cobalt superalloys described above deemed unweldable or marginally weldable can be repair welded to fill one or more voids on the casting using the same or similar pre-weld, weld, and post-weld vibration parameters, pulsed gas tungsten arc welding parameters, and weld deposit cooling parameters described above without weld-induced cracking of the casting.

The present invention provides a welding method that can be used for welding a nickel or cobalt superalloy member without weld-induced cracking for purposes other than weld repair of one or more surface voids without weld-induced cracking. For example, such a welding method may be used to fabricate a structure from nickel or cobalt base superalloy members that are joined together by welded joints. Although the invention has been described in detail with respect to certain embodiments, those skilled in the art will appreciate that modifications, changes and the like can be made therein without departing from the spirit and scope of the invention as set forth in the appended claims.

I claim:

1. A method of repairing a void on a nickel or cobalt superalloy investment casting, comprising:

solution heat treating said casting, clamping said casting on a welding table, vibrating said table at a sub-harmonic frequency for a time before filling said void with a superalloy filler material, vibrating said table at a sub-harmonic frequency while filling said void by repeatedly making incremental weld deposits of said superalloy filler material in said void using pulsed gas tungsten arc welding and impinging each incremental deposit with a cooling gas after each incremental weld deposit is made and before the next incremental weld deposit is made, and vibrating said table at a sub-harmonic frequency for a time after said void is filled.

2. The method of claim 1 wherein said arc welding is conducted with a pulsed welding current.

3. The method of claim 2 wherein said welding current is pulsed in the range of 440 to 460 pulses per second.

4. The method of claim 2 wherein said welding current is controlled to have a background current in the range of 5 to 8 amperes and a pulse current in the range of 75 to 85 amperes.

5. The method of claim 1 wherein said cooling gas comprises compressed shop air directed at each incremental deposit for a period of time.

6. The method of claim 1 wherein said sub-harmonic frequency is in the range of 40 to 50 Hertz.

* * * * *